United States Patent [19]
Stepp et al.

[11] Patent Number: 5,648,823
[45] Date of Patent: Jul. 15, 1997

[54] CIRCUIT CONFIGURATION FOR INTERMEDIATE FREQUENCY DEMODULATION AND DEVICE FOR VIDEO SIGNAL PROCESSING INCLUDING THE CIRCUIT

[75] Inventors: Richard Stepp; Hans Fiesel, both of München, Germany

[73] Assignee: Siemens Aktiengesellschaft AG, Munich, Germany

[21] Appl. No.: 509,411

[22] Filed: Jul. 31, 1995

[30] Foreign Application Priority Data

Jul. 29, 1994 [DE] Germany ................. 44 27 018.6

[51] Int. Cl.$^6$ ................................. H04N 5/455
[52] U.S. Cl. ................. 348/726; 348/737; 329/327; 455/337
[58] Field of Search ................. 348/726, 735, 348/737, 738, 731; 329/306, 307, 308, 323, 325, 327, 346; 331/22, 23; 455/323, 337; H04N 5/455, 5/21

[56] References Cited

U.S. PATENT DOCUMENTS

| | | | |
|---|---|---|---|
| 4,091,410 | 5/1978 | Citta | 455/337 |
| 4,394,626 | 7/1983 | Kurhara | 331/12 |
| 4,633,315 | 12/1986 | Kasperkovitz | 348/726 |
| 4,789,897 | 12/1988 | Kappler et al. | 348/726 |
| 4,796,102 | 1/1989 | McGinn | 358/195.1 |
| 4,814,715 | 3/1989 | Kasperkovitz | 329/327 |
| 4,929,905 | 5/1990 | Ruitenburg | 348/726 |
| 5,272,534 | 12/1993 | Vromans et al. | 358/191.1 |

FOREIGN PATENT DOCUMENTS

| | | |
|---|---|---|
| 0478821 | 4/1992 | European Pat. Off. |
| 0512624 | 11/1992 | European Pat. Off. |
| 3718103 | 12/1987 | Germany. |
| 2191367 | 12/1987 | United Kingdom. |

OTHER PUBLICATIONS

IEEE Publ. on Transactions on Consumer Electronics, vol. 37, No.4, Nov. 30, 1991, pp. 783–792, Brilka et al., "An Advanced 5V VIF–/SIF PLL for Signal Detection in TV Sets and VTRS".

Primary Examiner—Michael H. Lee
Assistant Examiner—Jeffrey S. Murrell
Attorney, Agent, or Firm—Herbert L. Lerner; Laurence A. Greenberg

[57] ABSTRACT

A circuit configuration for intermediate frequency demodulation for a video signal processing device includes an intermediate frequency filter to which an input signal converted to an intermediate frequency is delivered, and a mixer for demodulation with a simulated video carrier. In a further branch, the video carrier is eliminated from the input signal by a bandpass and converted in an oscillator into reference signals being mutually phase offset by 90°. A phase tracker ensures that the phase and frequency of the simulated video carrier are correct relative to the signal to be demodulated. The phase tracker contains in each of two branches a mixer and a low pass, through which a component separation of the video signal to be demodulated is carried out. The reference signals are weighted in further mixers with determined equisignal components and combined into the simulated video carrier.

6 Claims, 1 Drawing Sheet

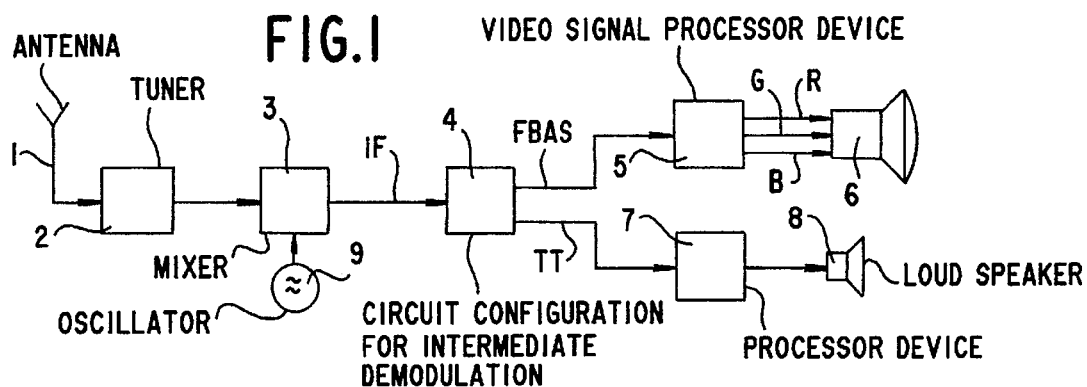
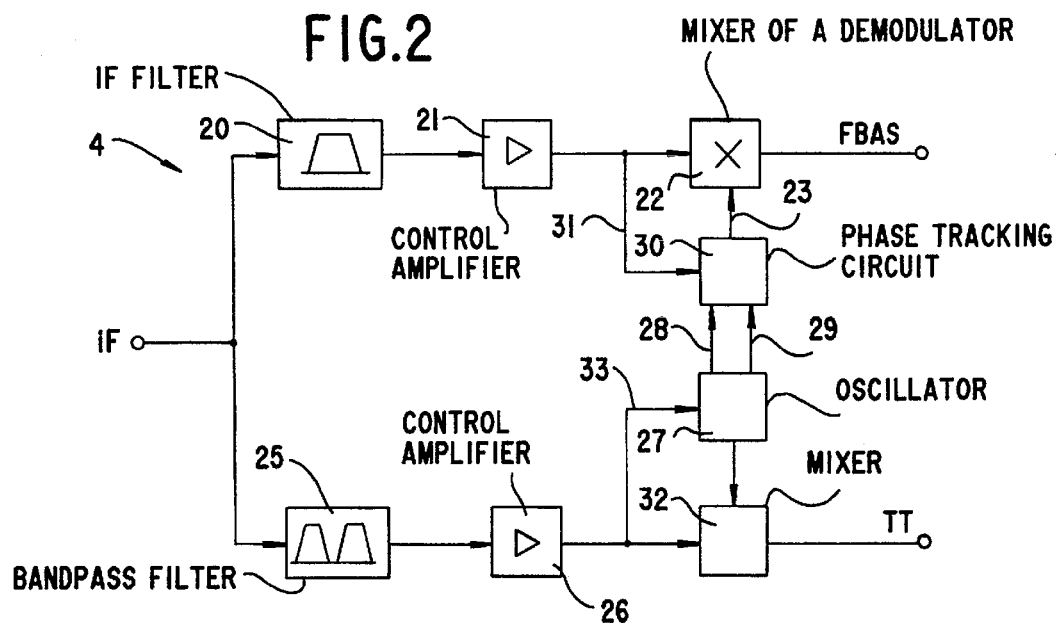
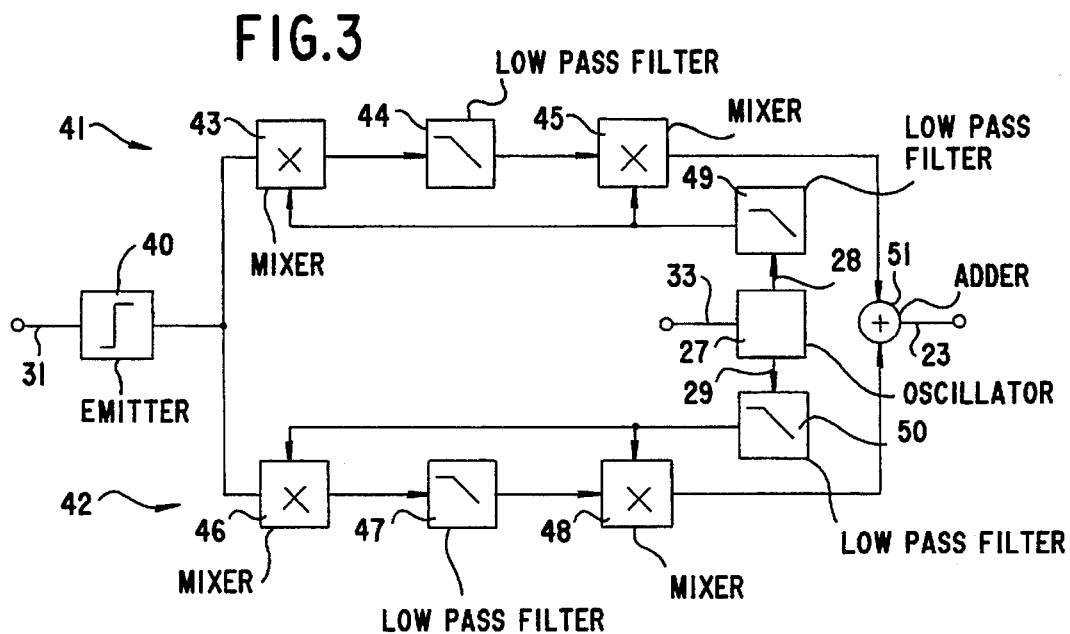

CIRCUIT CONFIGURATION FOR INTERMEDIATE FREQUENCY DEMODULATION AND DEVICE FOR VIDEO SIGNAL PROCESSING INCLUDING THE CIRCUIT

BACKGROUND OF THE INVENTION

Field of the Invention

The invention relates to a circuit configuration for intermediate frequency demodulation for a video signal processing device, including a first filter with a bandpass characteristic, to which an input signal at an intermediate frequency can be delivered and by which a video signal in an IF position is generated, a second filter with a bandpass characteristic, to which the input signal can be delivered and by which a video carrier signal is generated, and a demodulator, by which the video signal is converted in the IF position into a base band.

The invention also relates to a video signal processing device that includes such a circuit configuration.

In video signal processing devices, such as television sets, the frequency band of a selected transmitter is chosen through the use of a tuner, and from that band the frequency range of the selected transmitter is in turn converted into a constant intermediate frequency (IF). The video signals, transmitted by the asymmetric sideband transmission, are modulated into a video carrier. The sound carrier is located at the periphery of the picture signal spectrum. In order to ensure the least possible influence on the video signal and the sound carrier upon the conversion to the base band, the video signal carrier, as described in German Published, Non-Prosecuted Application DE 37 18 103 A1, corresponding to UK Application GB 2 191 367 A, is recovered in a further branch through the use of a suitably constructed bandpass filter. This bandpass filter is then used in the video signal branch to convert the video signal from the IF position into the base band. Since the recovered video carrier must be in phase with the video signal in the IF position as much as possible, the various filters and optionally provided control amplifiers must meet more stringent demands in terms of the signal delay time.

SUMMARY OF THE INVENTION

It is accordingly an object of the invention to provide a circuit configuration for intermediate frequency demodulation and a device for video signal processing including the circuit, which overcome the hereinafore-mentioned disadvantages of the heretofore-known circuits and devices of this general type and in which the aforementioned limitations in terms of the signal transit time of the functional elements are lessened. In particular, a simulated video carrier should be available at a demodulator with the most equal possible frequency and phase as compared to the video signal in an IF position.

With the foregoing and other objects in view there is provided, in accordance with the invention, a circuit configuration for intermediate frequency demodulation for a video signal processing device, comprising a first filter with a bandpass characteristic for receiving an input signal at an intermediate frequency and for generating a video signal in an IF position; a second filter with a bandpass characteristic for receiving the input signal and for generating a video carrier signal; a demodulator for converting the video signal in the IF position into a base band; an oscillator for receiving the video carrier signal and for generating both a reference signal being frequency-coupled to the video carrier signal and a reference signal being phase offset from it by 90°; a first and a second mixer each receiving a reference signal and supplying an output signal; the first mixer receiving the video signal in the IF position; a filter with a low pass characteristic carrying the output signal of the first mixer to the second mixer; a third and a fourth mixer each receiving the reference signal being phase offset by 90° and supplying output signals; the third mixer receiving the video signal in the IF position; a further filter with a low pass characteristic carrying the output signal of the third mixer to the fourth mixer; the output signals of the second and the fourth mixers being added together and delivered to the demodulator; and the filters being dimensioned to each be essentially permeable only to an equisignal component.

In accordance with another feature of the invention, there is provided a control amplifier connected between the first filter with a bandpass characteristic and the demodulator, and a control amplifier being connected between the second filter with a bandpass characteristic and the oscillator.

In accordance with a further feature of the invention, there is provided a limiter through which the video signal is delivered in the IF position to the first and the third mixers.

In accordance with an added feature of the invention, there are provided low-pass filters each delivering a respective one of the reference signal and the reference signal being phase offset by 90° to the mixers.

In accordance with an additional feature of the invention, the second filter having a bandpass characteristic and receiving the input signal generates a sound carrier signal in the IF position, and including a mixer receiving the sound carrier signal and one of the reference signals and generating a sound carrier.

With the objects of the invention in view, there is also provided an apparatus for video signal processing, comprising a device for generating an input signal at an intermediate frequency; the circuit configuration for intermediate frequency demodulation; a device for signal processing of the video signals in the base band; and a screen for receiving the processed video signals and displaying the video signals.

Through the use of the circuit according to the invention, a component breakdown of the IF video signal is carried out with respect to the orthogonal reference signals. The reference signals are in an arbitrary phase relationship with the IF video signal. The simulated video carrier reassembled from the recovered components is in phase with the IF video signal. Any difference in phase between the filtered-out video carrier and the IF video signal has no influence on the simulated video carrier. Even if the reference signals simulated by the oscillator do not exactly match the frequency of the IF video signal, a slight frequency difference can be compensated for. The prerequisite therefor is that the resultant beat frequencies be within the pass range of the low-pass filters.

U.S. Pat. No. 4,394,626 shows a circuit configuration in which a PSK input signal is fed into two phase detectors, constructed as multipliers, to which orthogonal signals derived from a VCO oscillator are also supplied. The output signals of the phase detectors are each delivered to one low-pass filter. Each of the low-pass filters is followed by a further multiplier, which is moreover triggered in turn by one of the orthogonal signals. The output signals of the further multipliers are added together in a logic circuit. The circuit is suitable for damping a phase jitter of the PSK signal, and the output signal should also follow rapid phase jumps on the part of the input signal. The low-pass filters must therefore be dimensioned in such a way that they are also permeable to the useful signal spectrum.

Other features which are considered as characteristic for the invention are set forth in the appended claims.

Although the invention is illustrated and described herein as embodied in a circuit configuration for intermediate frequency demodulation and a device for video signal processing including the circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a basic block and schematic circuit diagram of a television set;

FIG. 2 is a basic block circuit diagram of an IF demodulation stage according to the invention; and FIG. 3 is a basic block circuit diagram of a circuit for phase tracking.

DESCRIPTION OF THE PREFERRED EMBODIMENTS

Referring now to the figures of the drawing in detail and first, particularly, to FIG. 1 thereof, there is seen a television set which includes a tuner 2, to which an antenna signal can be delivered through an antenna 1. Tuning to the frequency band of the selected transmitter is carried out in the tuner 2. Through the use of a mixer 3, to which the output signal of a variable-frequency superposition oscillator 9 can be delivered, the selected transmitter from the frequency band chosen by the tuner 2 is converted to the intermediate frequency. The intermediate frequency is 38.9 MHz, for instance, for the video carrier. The sound signal also contained in the video signal that has been converted to the IF has a sound carrier at 33.4 MHz. In a circuit configuration 4 for intermediate frequency demodulation, on one hand the video signal is recovered in a base band FBAS without a sound carrier, and on the other hand the sound carrier TT, which is generally frequency modulated (FM) is recovered. In a video signal processing device 5, a signal RGB for triggering a picture tube 6 is generated from the video signal FBAS. In the sound channel, a signal for triggering a loudspeaker 8 is generated in a processing device 7.

One embodiment of the device 4 is shown in FIG. 2. The circuit configuration 4 is supplied, as its input signal, with the frequency band selected by the tuner and is then converted to the IF. The video carrier of the transmitter selected is at 38.9 MHz, and the sound carrier is at 33.4 MHz. An IF filter 20, to which the signal IF is delivered, filters out the signal frequencies associated with the transmitter selected. The filter 20 is typically constructed as a Nyquist filter. A control amplifier 21 is connected to the output side of the IF filter 20 and assures that the IF video signal will be within a predetermined output level range. The amplified IF video signal is converted in a mixer or demodulator 22 into the base band signal FBAS. To that end, the mixer 22 is supplied at a terminal 23 with a video carrier signal that is simulated with the correct frequency and phase in the circuit.

The circuit configuration 4 also has a bandpass filter 25, to which the IF input signal IF is supplied. The bandpass filter 25 is permeable to the picture carrier and the sound carrier in the IF position. Through the use of a control amplifier 26 on the output side of the bandpass filter 25, an oscillator 27 is synchronized to the video carrier formed by the bandpass filter 25. To that end, the oscillator has an input 33. A phase-locked loop PLL, or a frequency-sensitive phase-locked loop FPLL, is preferably used for the oscillator 27. The oscillator 27 generates reference signals, which are phase offset from one another by 90°, at two outputs 28, 29. These signals are frequency-coupled with the video signal fed into the oscillator at the terminal 33. The reference signals, together with the IF video signal generated at the control amplifier 21, are delivered to a phase tracking circuit 30, which generates the simulated video carrier on its output side, that is fed in at the terminal 23 of the mixer 22 for video demodulation.

The sound carrier TT obtained in the bandpass filter 25 is delivered to a mixer 32, where it is converted with the video carrier frequency simulated by the oscillator 27. The sound carrier TT is then present at 5.5 MHz at the output of the mixer 32. As an alternative to filtering out not only the video carrier but also the sound carrier in the filter 25, separate channels each with one bandpass filter that is permeable to only one of the respective carriers could be provided for filtering the video carrier and the sound carrier.

FIG. 3 shows in detail the phase tracking circuit 30, including the oscillator 27. The intermediate frequency, IF-filtered video signal is delivered to a terminal 31. It is typically amplitude modulated, so that through the use of a limiter 40, the AM signal component is essentially cut off. The output of the limiter 40 is delivered to two branches 41, 42, having signal paths which are connected in parallel. The branch 41 includes a mixer 43, which is connected on its input side to the output of the limiter 40 and to an output terminal 28 for one of the reference signals of the oscillator 27. The output-side mixed products of the mixer 43 include both an equal component and a component at twice the video carrier frequency. The equisignal components are carried onward through a low-pass filter 44. At a further mixer 45, the equisignal component generated by the low-pass filter 44 is mixed with the reference signal from the terminal 28 of the oscillator 27. The reference signal of the terminal 28 appears at the output of the mixer 45, weighted with the equisignal component furnished by the low-pass filter 44. The other branch 42 correspondingly includes a mixer 46, a low-pass filter 47, and a further mixer 48, which are connected in series. Instead of the reference signal of the terminal 28, a reference signal orthogonal to it but phase-offset by 90° and coming from a terminal 29 of the oscillator 27 is used. Once again, an equisignal component is then present at the output of the low-pass filter 47. The reference signal from terminal 29, phase-offset by 90°, is weighted in the mixer 48 with the equisignal component.

The equisignals present at the outputs of the low-pass filters 44, 47 represent a breakdown of components of the signal output by the limiter 40 with respect to the orthogonal reference carriers generated by the oscillator 27. Preferably, the orthogonal reference signals of terminals 28, 29 are each carried through a respective low-pass filter 49 and 50. The effect of the low-pass filters 49, 50 is that the reference signals output by the oscillator 27, which in a digital embodiment of the oscillator 27 are essentially present in the form of rectangular signals, are smoothed. The outputs of the low-pass filters 49, 50 then essentially contain only the fundamental wave of the reference signals.

The orthogonal reference signals at the outputs of the mixers 45, 48, weighted with the equisignal components, are added together in an adder 51. The signal that can be picked up at the terminal 23 matches in frequency the signal fed in at a terminal 33 of the oscillator 27. It also matches in phase the IF video signal input at the terminal 31. The phase relationship between the signals at the terminals 31, 33 has no influence on the output signal at the terminal 23. The signal that can be picked up at the terminal 23 is consequently always equal in frequency and phase to the carrier frequency video signal to be processed in the mixer 22.

The circuit of FIG. 3 also has the advantage of compensating for a slight frequency deviation between the signals at the terminals 31, 33. At the outputs of the mixers 43, 46, this kind of frequency deviation results in a beat frequency, which is carried on through the low-pass filters 44, 47, if the beat frequencies are each lower than the limit frequencies of the low-pass filters. Suitably, the low-pass filters are constructed with a limit frequency of from 200 to 300 KHz. This meets practical values for low-pass filters constructed with bipolar circuitry with the lowest possible limit frequency of their path range. An important factor is that the filters 44, 47 are essentially permeable only to the equisignal component, including the aforementioned beat frequencies. In any case, substantial portions of the useful signal spectrum, which is fed to the input 31 of the phase tracking circuit 30, must be prevented from being passable. If they were, this would mean that the simulated video carrier at the terminal 23 would be slightly modulated, so that problem-free conversion to the base band would not be possible.

We claim:

1. A circuit configuration for intermediate frequency demodulation for a video signal processing device, comprising:

a first filter with a bandpass characteristic for receiving an input signal at an intermediate frequency and for generating a video signal in an IF position;

a second filter with a bandpass characteristic for receiving the input signal and for generating a video carrier signal;

a mixer of a demodulator for converting the video signal in the IF position into a base band;

an oscillator for receiving the video carrier signal and for generating both a reference signal being frequency-coupled to the video carrier signal and a reference signal being phase offset from it by 90°;

a first and a second mixer each receiving a reference signal and supplying an output signal;

said first mixer receiving the video signal in the IF position;

a filter with a low pass characteristic carrying the output signal of said first mixer to said second mixer;

a third and a fourth mixer each receiving the reference signal being phase offset by 90° and supplying output signals;

said third mixer receiving the video signal in the IF position;

a further filter with a low pass characteristic carrying the output signal of said third mixer to said fourth mixer;

the output signals of said second and said fourth mixers being added together and delivered to said mixer of a demodulator; and all of said filters being dimensioned to each be essentially permeable only to an equisignal component.

2. The circuit configuration according to claim 1, including a control amplifier connected between said first filter with a bandpass characteristic and said demodulator, and a control amplifier being connected between said second filter with a bandpass characteristic and said oscillator.

3. The circuit configuration according to claim 1, including a limiter through which the video signal is delivered in the IF position to said first and said third mixers.

4. The circuit configuration according to claim 1, including low-pass filters each delivering a respective one of the reference signal and the reference signal being phase offset by 90° to said mixers.

5. The circuit configuration according to claim 1, wherein said second filter having a bandpass characteristic and receiving the input signal generates a sound carrier signal in the IF position, and including a mixer receiving the sound carrier signal and one of the reference signals and generating a sound carrier.

6. A apparatus for video signal processing, comprising:

a device for generating an input signal at an intermediate frequency;

a circuit configuration for intermediate frequency demodulation including:

a first filter with a bandpass characteristic for receiving the input signal at the intermediate frequency and for generating a video signal in an IF position;

a second filter with a bandpass characteristic for receiving the input signal and for generating a video carrier signal;

a mixer of a demodulator for converting the video signal in the IF position into a base band;

an oscillator for receiving the video carrier signal and for generating both a reference signal being frequency-coupled to the video carrier signal and a reference signal being phase offset from it by 90°;

a first and a second mixer each receiving a reference signal and supplying an output signal;

said first mixer receiving the video signal in the IF position;

a filter with a low pass characteristic carrying the output signal of said first mixer to said second mixer;

a third and a fourth mixer each receiving the reference signal being phase offset by 90° and supplying output signals;

said third mixer receiving the video signal in the IF position;

a further filter with a low pass characteristic carrying the output signal of said third mixer to said fourth mixer;

the output signals of said second and said fourth mixers being added together and delivered to said mixer of a demodulator; and all of said filters being dimensioned to each be essentially permeable only to an equisignal component;

a device for signal processing of the video signals in the base band; and a screen for receiving the processed video signals and displaying the video signal.

* * * * *